(12) United States Patent
Xie

(10) Patent No.: US 8,205,446 B2
(45) Date of Patent: Jun. 26, 2012

(54) DRIVING UNIT FOR BRAKE

(75) Inventor: Xingyun Xie, Changsha (CN)

(73) Assignee: Xingyun Xie, Changsha (CN)

( * ) Notice: Subject to any disclaimer, the term of this patent is extended or adjusted under 35 U.S.C. 154(b) by 800 days.

(21) Appl. No.: 12/267,004

(22) Filed: Nov. 7, 2008

(65) Prior Publication Data

US 2010/0115943 A1    May 13, 2010

(51) Int. Cl.
*F15B 11/02* (2006.01)
*F16D 65/14* (2006.01)

(52) U.S. Cl. .................................. 60/545; 60/593; 92/20

(58) Field of Classification Search ...................... 60/545, 60/593; 92/15, 20; 303/2, 3
See application file for complete search history.

(56) References Cited

U.S. PATENT DOCUMENTS

| 4,805,740 | A | * | 2/1989 | Wilke et al. | 188/173 |
| 5,244,060 | A | * | 9/1993 | Tanaka et al. | 187/261 |
| 7,163,090 | B2 | * | 1/2007 | Huber et al. | 188/170 |

FOREIGN PATENT DOCUMENTS

| CN | 2146469 Y | | 11/1993 |
| CN | 2512928 Y | | 9/2002 |
| CN | 2605419 Y | | 3/2004 |
| CN | 2937582 Y | * | 8/2007 |
| CN | 101086283 | | 12/2007 |
| WO | WO-2005/075848 A1 | | 8/2005 |

* cited by examiner

*Primary Examiner* — Thomas E Lazo
(74) *Attorney, Agent, or Firm* — Perkins Coie LLP

(57) ABSTRACT

Disclosed is driving unit (1) for a brake (100) comprising: a driving device (2); a hydraulic pump (3) driven by said driving device (2); a hydraulic cylinder (5) in fluid communicating with the hydraulic pump (3) and driven by said hydraulic pump (3). The hydraulic pump (5) is operably connected with one piston rod (7) to drive the piston rod (5) to reciprocate, said piston rod (5) is drivingly connected with a braking portion (8) of the brake (100). The driving unit (1) is further provided with a holding device (10) for keeping the braking portion (8) under an operation state. The present invention further discloses a brake (100) having such driving unit (1).

19 Claims, 5 Drawing Sheets

DRIVING UNIT FOR BRAKE

TECHNICAL FIELD

The present invention relates to a brake field, more particularly, to an improved driving unit used for a brake and a brake having such driving unit.

BACKGROUND

In the prior art, for example, the patent document CN2605419Y filed on Mar. 3, 2004 discloses a long life brake, which is constituted by a braking portion and a driving unit. The disclosed driving unit structure comprises a driving device and an oil pump as well as an oil storage tank and an oil hydraulic cylinder driven by the driving device, an inlet of the oil pump is communicated with the oil storage tank, an outlet of the oil pump is communicated with a driving oil cavity of the oil hydraulic cylinder. A piston rod, i.e. a push rod is used for the hinge connection of driving mechanisms in the braking portion, and the driving unit is operated so that the braking portion achieves the operation state (brake on or brake off mode).

The existing driving unit has following shortages: since the driving unit is used for keeping the operating state of the braking portion during the operating process, the driving device of the driving unit is required to under operating state all the time so that the oil pump continuously operates to maintain the operating state of the braking portion, thus the energy consumption is large. Further, the temperature rise of the driving device is high due to the driving device being under the operating state all the time, thereby each component of the driving unit is heated. Besides, such heating may be easy to cause aging of sealing members, such that the life span is affected, and in extreme cases the oil leak can be caused, and the workload in maintaining and repairing of the brake is increased.

In addition, braking off mode of the braking operation state of the braking portion is achieved by stopping the operation of the driving device. When cutting off the power supply of the driving device, since the driving device has an operation inertia, there is a postpone time from the cutting off of the power supply to completely stopping of the operation, therefore, the releasing of operation state of the braking portion is caused slow and it is unable to satisfy an operation demand in the case where a rapid braking off is required.

SUMMARY

Accordingly, the object of the present invention is to overcome at least one aspect of problems and shortages in prior arts.

One of objects of the present invention is to propose a driving unit for a brake, which is able to reduce the energy consumption.

Another object of the present invention is to provide a driving unit for a brake, which is able to reduce the temperature rise.

A further object of the present invention is to provide a driving unit for a brake, which is able to achieve rapid braking off of the operation state of the braking portion.

According to one aspect of the present invention, which provides a driving unit for a brake comprising: a driving device; a hydraulic pump driven by said driving device; a hydraulic cylinder in fluid communication with the hydraulic pump and driven by said hydraulic pump, wherein the hydraulic pump is operably connected with a piston rod to drive the piston rod to reciprocate, said piston rod is drivingly connected with a braking portion of the brake, wherein said driving unit is further provided with a holding device for keeping the braking portion under an operation state.

In one embodiment, said holding device is configured to surround the piston rod, said holding device includes a static iron core fixedly connected with a driving unit body, and a dynamic iron core connected with the piston rod to move together with the piston rod, said static iron core and said dynamic iron core are able to attract and engage with each other under the electromagnetic action.

Alternatively, said hydraulic cylinder is fixedly connected with the piston rod. Alternatively, said hydraulic cylinder is engaged with the piston rod in a contact engaging structure, wherein: said hydraulic cylinder is moved forwardly to contact with the piston rod and engaged with each other under the action of the driving device; and under the action of releasing the driving device, the hydraulic cylinder is moved backwardly to disengage from the piston rod with the action of a biasing device.

In detail, the biasing device comprises a compression spring provided between the piston rod and the hydraulic cylinder or a tensile spring provided between the hydraulic cylinder and the hydraulic pump.

In one particular embodiment, the holding device is provided in a cavity at one end of the driving unit body, said cavity is opened at one end, a cover plate is removably connected onto the opening of the cavity to easily assemble and disassemble the holding device.

In another particular embodiment, the holding device is provided onto a driving mechanism of the braking portion, wherein the holding device comprises: the dynamic iron core connected with the driving mechanism and the static iron core fixedly connected with a holding rod, wherein the holding rod is penetrated through the dynamic iron core of the holding device.

In a further particular embodiment, the holding device is provided on a braking arm of the braking portion, the holding device includes the dynamic iron core connected with the braking arm and the static iron core fixedly connected with an outer end of a braking spring push rod, the braking spring push rod is penetrated through the dynamic iron core of the holding device.

Preferably, the driving unit for the brake further comprises a liquid storage tank, in which the hydraulic cylinder and the hydraulic pump are accommodated.

Preferably, an inlet of said hydraulic pump is communicated with the liquid storage tank; and an outlet of said hydraulic pump is communicated with a driving liquid cavity of the hydraulic cylinder.

Particularly, the hydraulic pump is an impeller typed centrifugal pump or a plunger pump.

According to another aspect of the present invention, it is provided a brake comprising: a braking portion; and a driving unit, said driving unit comprising: a driving device; a hydraulic pump driven by said driving device; a hydraulic cylinder in fluid communication with the hydraulic pump and driven by said hydraulic pump, wherein the hydraulic pump is operably connected with one piston rod to drive the piston rod to reciprocate, said piston rod is drivingly connected with a braking portion of the brake, wherein said brake is further provided with a holding device for keeping the braking portion under an operation state.

Further, the braking portion comprises a driving mechanism, said piston rod is operably connected with the driving mechanism of the braking portion in a hinge form.

In particularly, the braking portion includes two opposing braking arms; corresponding braking scotches respectively provided on said two braking arms; and a braking wheel sandwiched between said two braking scotches.

Further, a spring push rod is further provided between said two braking arms.

In another embodiment, said holding device is configured to surround the piston rod, said holding device includes a static iron core fixedly connected with a driving unit body, and a dynamic iron core connected with the piston rod to move together with the piston rod, said static iron core and said dynamic iron core are able to attract and engage with each other under the electromagnetic action.

More particularly, the holding device is provided in a cavity at one end of the driving unit body, said cavity is opened at one end, a cover plate is removably connected onto the opening of the cavity to easily assemble and disassemble the holding device.

In another embodiment, the holding device is provided onto a driving mechanism of the braking portion, the holding device comprises the dynamic iron core connected with the driving mechanism and the static iron core fixedly connected with a holding rod, wherein the holding rod is penetrated through the dynamic iron core of the holding device.

In a further embodiment, the holding device is provided on a braking arm of the braking portion, the holding device includes the dynamic iron core connected with the braking arm and the static iron core fixedly connected with an outer end of a braking spring push rod, the braking spring push rod is penetrated through the dynamic iron core of the holding device.

By employing the brake for the driving unit and the driving unit of the present invention, the driving device drives the hydraulic pump, the pressured liquid is entered into the driving liquid cavity of the hydraulic cylinder, then the piston rod, i.e. the push rod is driven to move upwardly to the predetermined position so as to allow the braking portion to reach the operation state. By now, the electromagnetic device is energized to operate, to keep the piston rod (i.e. the push rod) under the fixed position state, so that the operation state of the braking portion is maintained. Then, the driving device is powered off, and it is stopped to operate; thereafter, when the electromagnet device is powered off, the piston rod (i.e. the push rod) is moved downwardly by the action of the biasing device, for example, a push bar spring, in the braking portion, that is, the operation state of the braking portion is released.

Comparing with the background art, the present invention has following technical effects:

1. Since the driving unit is provided with the electromagnetic device served as the holding device, when the electromagnetic device is energized to operate, the operation state of the braking portion is kept, and then the driving device can be powered off, then the driving device is stopped and no electrical power is consumed, so that the power saving effect can be obtained.

2. When the electromagnetic device is energized to operate to make the braking portion maintain the operation state, the driving device is stopped by powering the driving device off, therefore, during operation process of the driving unit, the heat generated by the driving device is greatly reduced. Since the heat of the driving device is reduced, the temperature rise during the operation of the driving device is low, and the influence on each component is small, the life span of each component is extended, and work loads of maintaining and repairing of the brake is decreased.

3. When the electromagnetic device is energized to operate to allow the braking portion to maintain the operation state, the driving device can be stopped and no electrical power is consumed. Since the power consumption of the electromagnetic device being operated is lower than that of the driving device being operated, but in the prior art, the driving device is required to stay under the operation state all the time to keep the operation state of the braking portion, thus, the driving unit has a technical effect with reduced power consumption.

4. The present invention utilizes stopping the operation of the electromagnetic device to release the operation state of the braking portion. Since the electromagnetic device has less inertia after powered off, the rapid release can be achieved. However, in the prior art, the operation state of the braking portion is released by stopping the operation of the driving device, and the driving device in the prior art has a large inertia from the time after the power off to the time before completely stopping, the releasing thereof is slow. Therefore, the present invention provides a quick response in releasing the operation of the braking portion, so that the requirement of quick releasing of the operation state of the braking portion is satisfied.

BRIEF DESCRIPTION OF THE DRAWINGS

FIG. 3 is a structural view of a form of the driving unit in a second embodiment according to the present invention, in which the structure of the driving device 2 uses electromagnet, wherein

DETAILED DESCRIPTION

Figure 1:
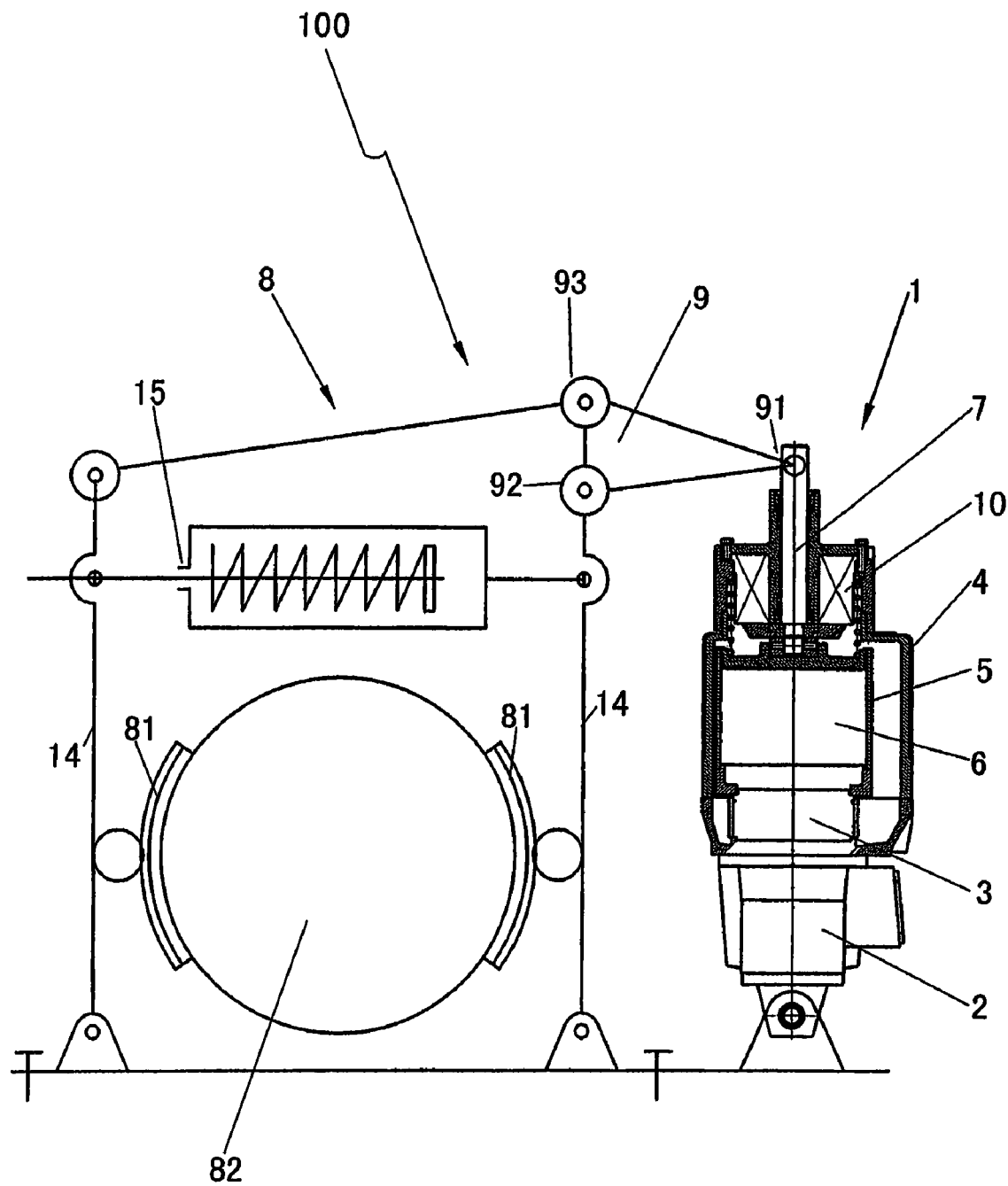
FIG. 1 is schematic view of an overall structure of a brake in a first embodiment according to the present invention, in which a braking portion 8 of a brake 100 and a driving unit 1 are shown.

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

FIG. 1 is shown a driving unit 1 for a brake 100 in a first embodiment according to the present invention. Referring to FIG. 1, the brake 100 is structured by a braking portion 8 and the driving unit 1. In one embodiment, referring to FIG. 1, the braking portion 8 includes two opposing braking arms 14, 14 arranged to correspond to each other; corresponding braking scotches 81, 81 respectively disposed on two braking arms, and a braking wheel 82 being sandwiched between two braking scotches 81. Further, a spring push rod 15 may be provided between two braking arms 14, 14.

Figure 2:
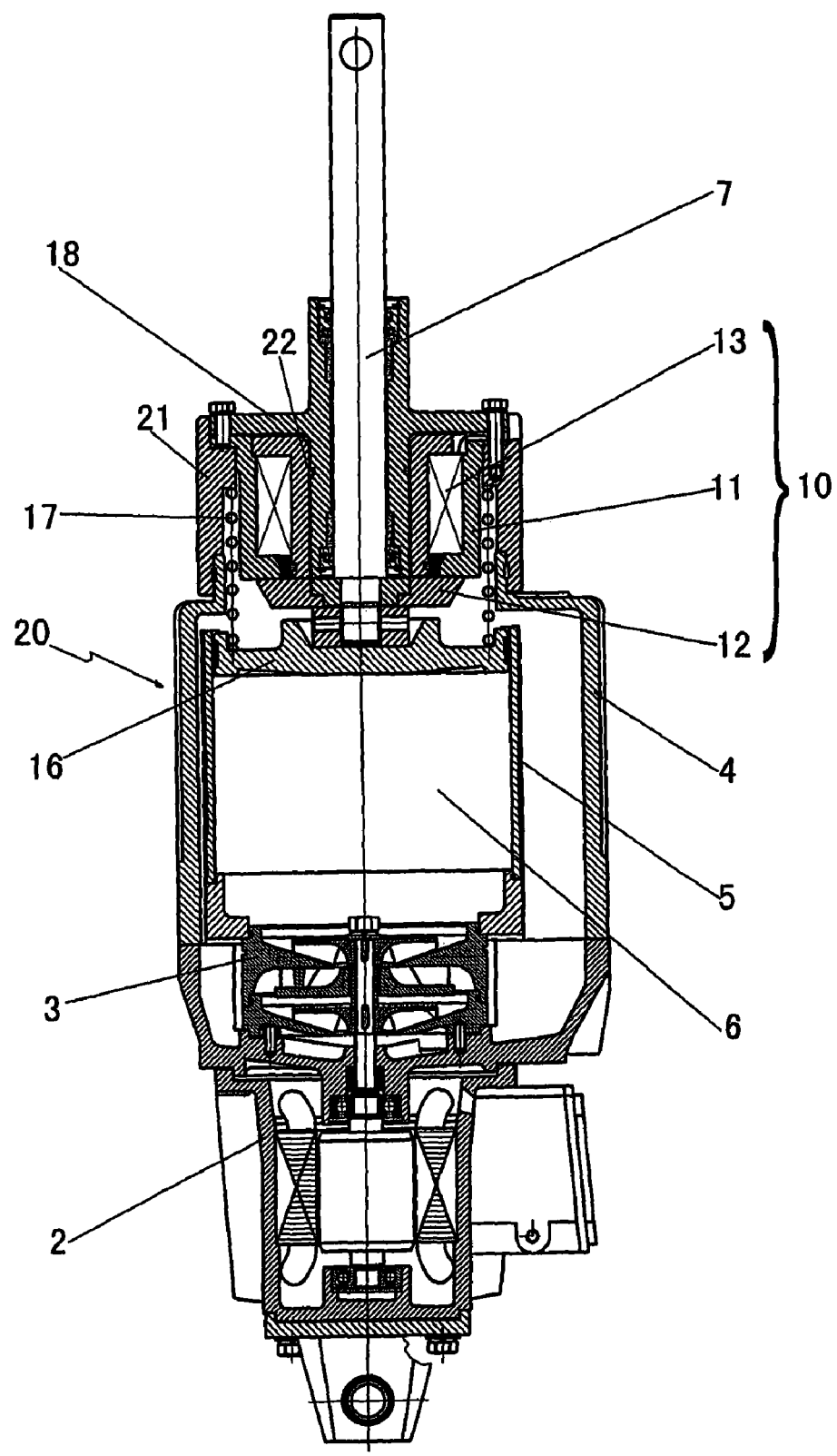
FIG. 2 is a structural view of the driving unit in the first embodiment according to the present invention, in which the structure of the driving device 2 employs a motor.

Refer to FIGS. 1-2, the driving unit 1 according to an embodiment of the present invention comprises a driving device 2, a hydraulic pump 3 driven by the driving device 2, a hydraulic cylinder 5 communicated with the hydraulic pump 3 and driven by the hydraulic pump 3, wherein the hydraulic cylinder 5 may be operatively connected to a piston rod 7 to drive the piston rod 7 to reciprocate. The piston rod 7 is drivingly connected to the braking portion 8 of the brake 100, wherein the driving unit is further provided with a holding device to keep the braking portion 8 under the operation state.

Refer to FIGS. 1-2, the driving unit for the brake further comprises a liquid storage tank 4, in which the hydraulic cylinder 5 and the hydraulic pump 3 are received. Preferably, an inlet of the hydraulic pump 3 is communicated with the liquid storage tank 4, and an outlet thereof is communicated with a driving liquid cavity 6 of the hydraulic cylinder 5.

Refer to FIG. 1, the piston rod, i.e. the push rod 7 is hinged with a driving mechanism 9 of the braking portion 8 at a joint 91 so as to drive the driving mechanism 9 of the braking portion 8. As shown in FIG. 1, the driving mechanism 9 is a pendulum rod in a substantial triangle shape. When the piston rod, i.e. push rod 7 of the hydraulic cylinder 5 is moved upwardly under the action of the driving device 2, an upper fixed point 93 of the driving mechanism 9 is swung in a leftward direction in the FIG. 1 about the joint 92 on the braking arm 14 which is fixed at right side, so that the braking arm 14 at left side is pushed, and the biasing force of the spring push rod 15 is overcome. Thereby, the corresponding braking scotches 81, 81 provided on two braking arms 14, 14 release the braking effect on the braking wheel 82 sandwiched between two braking scotches 81, 81, so that the brake is brought into a brake off operation state. On the contrary, when the piston rod, i.e. push rod 7 of the hydraulic cylinder 5 is moved downwardly under the effect of the driving device 2, the upper fixed point 93 of the driving mechanism 9 is swung in a rightward direction in the FIG. 1 about the joint 92 on the braking arm 14 fixed at the right side, so that the braking arm 14 is returned back to the original state, and the biasing force applied on the spring push rod 15 by the braking arm 14 is released. Thereby, under the biasing force of the spring push rod 15, i.e. under the tension of the spring, corresponding braking scotches 81, 81 provided on two braking arms 14, 14 apply a braking effect on the braking wheel 82 sandwiched between two braking scotches 81, 81, so that the brake is brought into braking operation state.

Above driving device 2 can be different typed driving devices, as shown in FIG. 2, the driving device 2 may use a motor, and the hydraulic pump 3 is a centrifugal impeller pump. However, the present invention is not limited thereto, for example, as shown in FIGS. 3A and 3B, the driving device 2 may adopt a electromagnet form, and the hydraulic pump 3 may be a plunger pump integrated with the electromagnet 2.

Figure 3A:
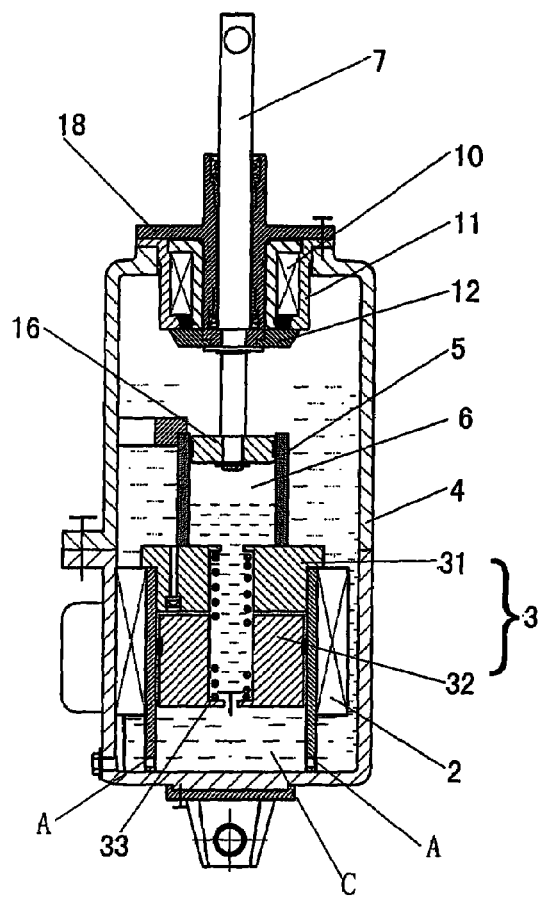
FIG. 3A is shown a sketch view that the electromagnetic device is under operation state.
Figure 3B:
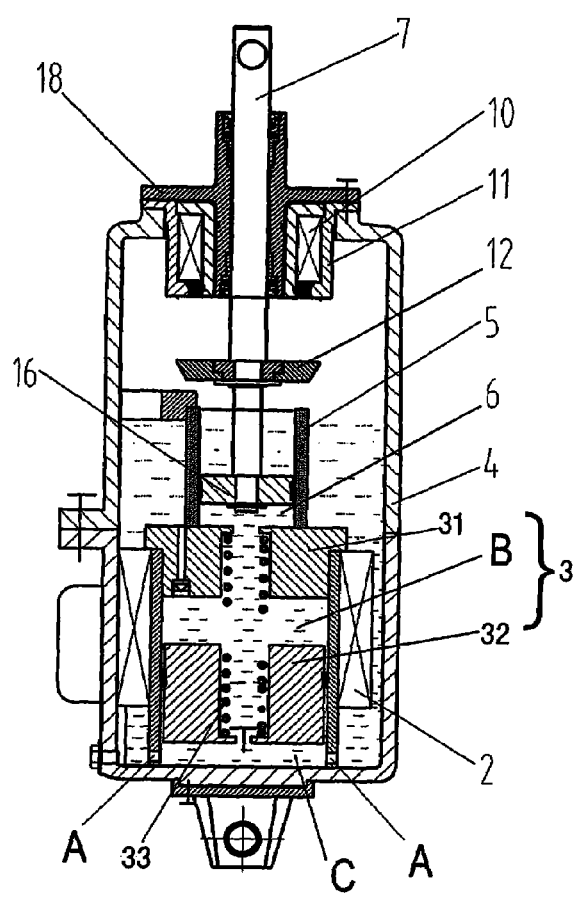
FIG. 3B is shown a sketch view that the electromagnetic device is under non-operation state.

FIG. 3B shows an un-operating state of the plunger pump, a pump cavity B is provided between a lower core 32 and an upper core 31 of plunger pump, a pump cavity C is provided below the lower core 32, the piston rod, i.e. push rod 7 is under lower position state, a dynamic iron core 12 of the electromagnetic device 10 is disengaged from the static iron core 11.

Under the state shown in FIG. 3B, when the driving device 2, i.e. the electromagnet is powered on, due to the action of electromagnet force under the electromagnet being powered on, the lower core 32 of the plunger pump 3 overcomes the elastic member in the plunger pump cavity, for example, the elastic force of the compression spring 33 moves upwardly to engage with the upper core 31, liquid within the pump cavity B (as shown in FIG. 3B) is injected into the driving liquid cavity 6, the pump cavity B is going to close (as shown in FIG. 3A). At the same time, during the lower core 32 of the plunger pump 3 being moved upwardly, the pump cavity C is expanded (as shown in FIG. 3A), then the liquid within the liquid storage tank 4 is entered into the pump cavity C through a hole A at the lower portion of the case of the plunger pump 3 to eliminate vacuum formed by the pump cavity C to achieve balance. Here, the plunger pump is under the operation state shown in the FIG. 3A, the piston rod, i.e. the push rod 7 is raised to the higher position state, the electromagnetic device 10 is powered on, the dynamic iron core 12 of the electromagnet 10 is attracted and engaged with the static iron core 11 and is kept in stabilized and fixed condition. Since the dynamic iron core 12 connects with the lower portion of the piston rod, i.e. the push rod 7, such that the piston rod, i.e. the push rod 7 is retained in the higher position state, so that the braking portion 8 is maintained under the operation state. Under such state, the driving device 2 (electromagnet) can be powered off, so that the energy saving is implemented.

Further, after the driving device 2 (electromagnet) is powered off, the lower core 32 of the hydraulic pump 3 is moved downwardly under the elastic force of the compression spring 33 and the pump cavity B is regenerated (see FIG. 3B), then the liquid within the driving liquid cavity is downwardly entered into the pump cavity B. Accordingly, liquid pressure inside the driving liquid cavity 6 is decreased. During the lower core 32 of the hydraulic pump 3 being moved downwardly, a part of the liquid within the pump cavity C at the bottom portion of the pump body can be supplemented into the pump cavity B via a one-way valve (not shown in Figs.), another part of the liquid therein is refluxed into the liquid storage tank 4 via the hole A at the lower portion of the plunger pump case, so that the pump cavity C becomes small, which is under the state shown in FIG. 3B.

Under the state shown in FIG. 3A, when the electromagnetic device 10 is powered off, and the driving device 2 (electromagnet) has been powered off, because of the force of the operating spring, for example spring push rod 15, within the braking portion 8, the piston rod (i.e. push rod) 7 is moved downwardly and followed with the dynamic iron core 12 of the electromagnetic device 10 being moved downwardly. As described above, since the liquid pressure within the driving liquid cavity 6 has been dropped, so that comparing with the prior art, the quick downward movement of the push rod 7 can be achieved, that is the rapid release of the braking state can be achieved.

There is a lot of deposition ways as the holding device for the electromagnetic device 10, different deposition ways for the electromagnetic device 10 shown in FIGS. 2, 3, 4, 5 are described hereafter.

As shown in FIG. 2, the electromagnetic device 10 is located above the hydraulic cylinder 5, i.e. is provided at one end of the piston rod of the hydraulic cylinder 5. The electromagnetic device 10 is configured to surround the piston rod 7, which comprises the static iron core 11 fixedly connecting with the driving unit body 20, the dynamic iron core 12 connected with the piston rod 7 to move together with the piston rod 7, the static iron core 11 and the dynamic iron core 12 can be attracted to and engaged with each other under the electromagnetic action. In detail, refer to FIGS. 1-3, the static iron core 11 of the electromagnetic device 10 is connected with the driving unit body 20, the dynamic iron core 12 of the electromagnetic device 10 is connected with the lower portion of the piston rod (push rod) 7 and the dynamic iron core 12 is moved along with the piston rod (i.e. push rod) 7. Similarly, the electromagnetic device 10 shown in FIG. 3 is provided above the hydraulic cylinder 5.

In one embodiment, refer to FIGS. 1-3, the electromagnetic device 10 is provided to surround the piston rod 7, which comprises the static iron core 11 fixedly connecting with the driving unit body 20, the dynamic iron core 12 connected with the piston rod 7 to move together with the piston rod 7, and a electromagnetic coil 13 provided between the static iron core 11 and the dynamic iron core 12, the static iron core 11 and the dynamic iron core 12 can be attracted to each other when the electromagnetic coil 13 is powered on. However, the present invention is not limited thereto; apparently, the electromagnetic coil 13 can be incorporated with any one of the static iron core 11 and the dynamic iron core 12, as long as the static iron core 11 and the dynamic iron core 12 can be attracted to and engaged with each other under the electromagnetic action.

In one embodiment, the electromagnetic device 10 is provided within a cavity 22 at one end of the driving unit body 20, one end of the cavity 22 has an opening, and a cover plate 18 is removably connected onto the opening of the cavity 22 to easily ensure the assembly and disassembly of the holding device 10.

In above embodiment, the driving unit body 20 is made up of a case portion 21 of the holding device 10, a housing portion of the liquid storage tank 4, and a case of the hydraulic pump 3. Apparently, the present invention is not limited thereto, for example, the driving unit body 20 can have an integrated form.

When the driving device 2 drives the centrifugal pump 3, the pressured liquid is entered into the driving liquid cavity 6 of the hydraulic cylinder 5. When the piston rod (i.e. push rod) 7 is driven to move upwardly to the predetermined position, the braking portion 8 is brought into an operation state. Here, the electromagnetic device 10 is energized to operate, due to the electromagnetic action, the dynamic core 12 is attracted and engaged with the static core 11, so that the piston rod (i.e. push rod) 7 is kept in the fixed positioning state, such that the braking portion 8 is kept under the operation state. Thereafter, the power of the driving device 2 is cut off, and the operation of the driving device is stopped and the power consumption is reduced.

Alternatively, the hydraulic cylinder 5 is fixedly connected with the piston rod 7. Refer to FIG. 2, the piston rod (i.e. push rod) 7 of the hydraulic cylinder 5 is fixed connected with the piston ring 16 in a fixed connection structure. Alternatively, the hydraulic cylinder 5 is connected with the piston rod 7 in a contact engagement structure, wherein the hydraulic cylinder 5 is moved in a forward direction, i.e. in an upward direction in FIG. 1, under the action of the driving device 2 to contact and engage with the piston rod 7, also, under the action of releasing the driving device 2, the hydraulic cylinder 5 is moved backwardly under the action of the biasing device, for example a spring, to disengage with the piston rod 7. In detail, the biasing device can comprise either a compression spring provided between the piston rod 7 and the hydraulic cylinder 5 or a tensile spring provided between the hydraulic cylinder 5 and the hydraulic pump 3.

As shown in FIG. 2, a piston ring 16 is provided in the hydraulic cylinder 5 and reciprocates under the action of hydraulic pressure; the push rod 7 is connected with the piston ring 16 in the contact engagement structure and provided with a spring 17 acting on the piston ring 16. Refer to FIG. 2, the spring 17 can be located at the upper end of the piston ring 16, when it is located at the upper end of the piston ring 16, the spring 17 is a compression spring; and when the spring 17 is located at the lower end of the piston ring 16, i.e. within the cylinder body which is not shown in the figures, the spring 17 is a compression spring.

Hereafter, according to the present invention, refer to FIGS. 1-2, the operation process of the brake having the driving unit is explained. When the pressured liquid drives the piston ring 16 to move upwardly, the elastic force of the spring 17 is overcome, the piston rod (i.e. the push rod) 7 is driven to move upwardly, so that the braking portion 8 is under operation state. Here, the electromagnetic device 10 is energized to operate, so that the piston rod (i.e. the push rod) 7 is kept under the fixed position state, and the braking portion 8 is kept under the operation state, the driving device 2 is powered off and the operation thereof is stopped. Since the operation of the driving device 2 is stopped, the pressure applied on the pressured liquid is removed.

By now, under the action of the compression spring 17, since the connection between the piston ring 16 and the piston rod (i.e. the push rod) 7 is in the form of the contact engagement structure rather than a fixation, the piston ring 16 is disengaged with the lower end of piston rod (i.e. the push rod) 7 under the action of the spring 17 to move downwardly, so that the liquid within the cylinder is refluxed back to the liquid storage tank 4 in advance. Above structures have following effects: when the operation state of the braking portion is released, since the liquid in the pressured liquid cavity of the hydraulic cylinder has already been refluxed back to the liquid storage tank 4, the piston rod (i.e. the push rod) 7 is speeded up the velocity of downward movement under the action of the spring 17 within the braking portion 8, that is, it is facilitated to expedite the releasing for the operation state of the braking portion to satisfy the requirement of the rapid releasing for the operation state of the braking portion 8.

FIG. 3 is a structural view of the form of the driving unit in a second embodiment according to the present invention, in which the structure of the driving device 2 employs an electromagnet. As shown in FIG. 3, the push rod 7 and the piston ring 16 can have a fixed connection structure, during the operation, the piston ring 16 and the piston rod (i.e. the push rod) 7 are moved simultaneously and are driven by the pressured liquid when moving upwardly, the rapid descending of the braking portion when the operation state is released is achieved by virtue of the action of the spring in the braking portion 8.

Figure 4:
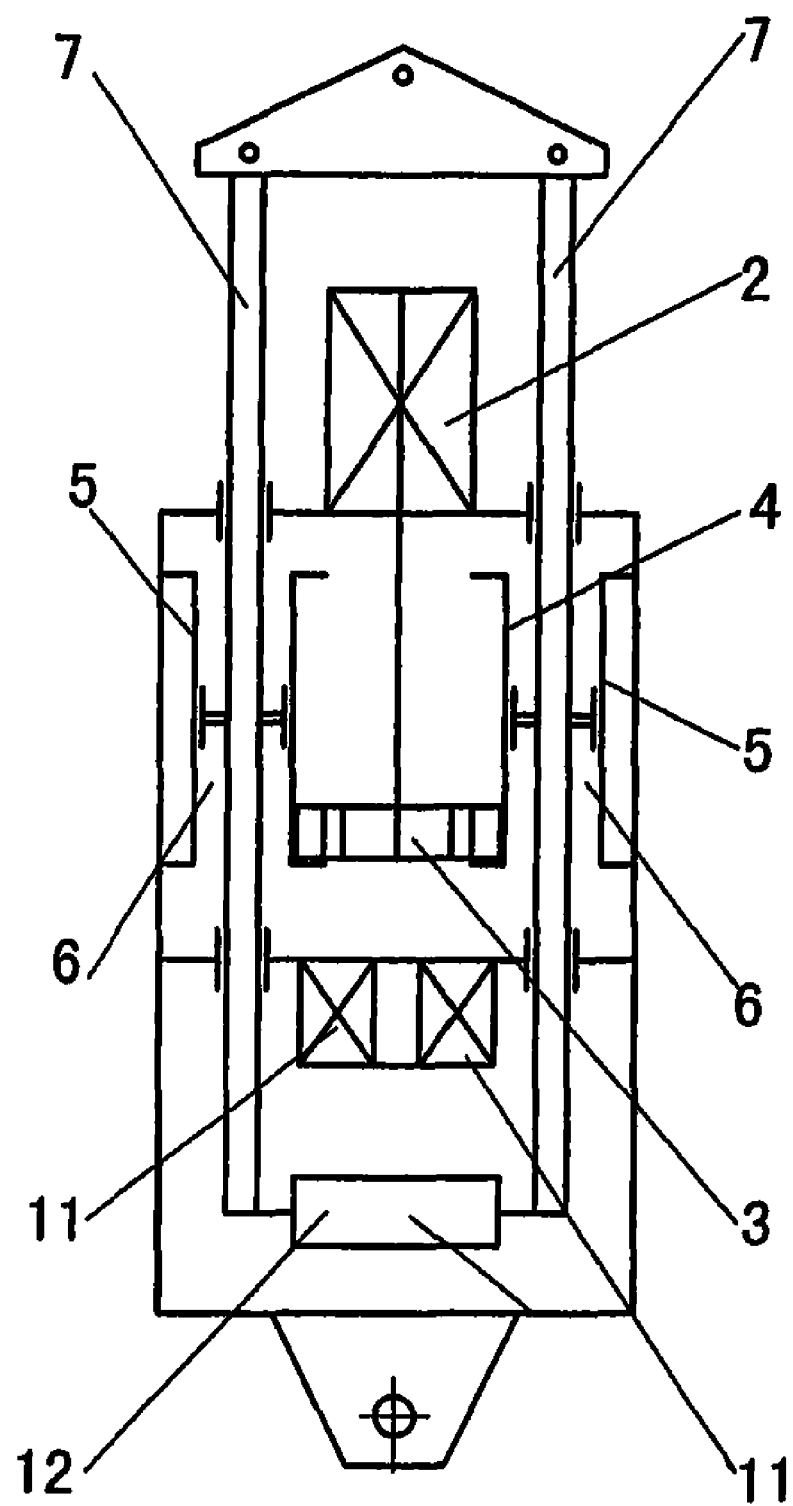
FIG. 4 is a structural view of the driving unit in a third embodiment according to the present invention, in which a variation of the electromagnetic device 10 is shown.

FIG. 4 is a structural view of the driving unit in a third embodiment according to the present invention, in which a variation of the electromagnetic device 10 is shown. The driving unit 1 in FIG. 4 is provided with two hydraulic cylinders 5 and the number of piston rods (i.e. the push rods) 7 are two. The electromagnetic device 10 is provided at the middle lower portion of piston rods (i.e. the push rods) 7, and the static iron core 11 of the electromagnetic device 10 is connected with the wall of the driving unit body, and the dynamic iron core 12 of the electromagnetic device 10 is connected with the lower end of both piston rods (i.e. the push rods) 7. With such configuration, piston rings of hydraulic cylinders 5 are located at the middle portion of piston rods (i.e. the push rods) 7.

The operation process of the driving unit in the third embodiment according to the present invention is as follows: when the driving device 2 is operated, the hydraulic pump 3 is operated and the pressured liquid enters into driving liquid cavities 6 of two hydraulic cylinders 5. Two piston rods (i.e. the push rods) 7 are moved upwardly to a predetermined location at the same time, so that the braking portion is brought into an operation state, and the dynamic iron core 12 follows two piston rods (i.e. the push rods) 7 to move upwardly so as to attract to and engage with the static iron core 11. Thus, two piston rods (i.e. the push rods) 7 are kept under fixed position states, accordingly, the braking portion is kept under the operation state. When the operation state of the braking portion is required to be released, the electromagnetic device 10 is powered off, and electromagnetic force of the dynamic iron core 12 and the static iron core 11 is released. Two piston rods (i.e. the push rods) 7 are moved downwardly under the action of the spring, i.e. spring push rod, in the braking portion 8, so that the operation state of the braking portion is released and the dynamic iron core 12 follows the push rods 7 to move downwardly.

Figure 5:
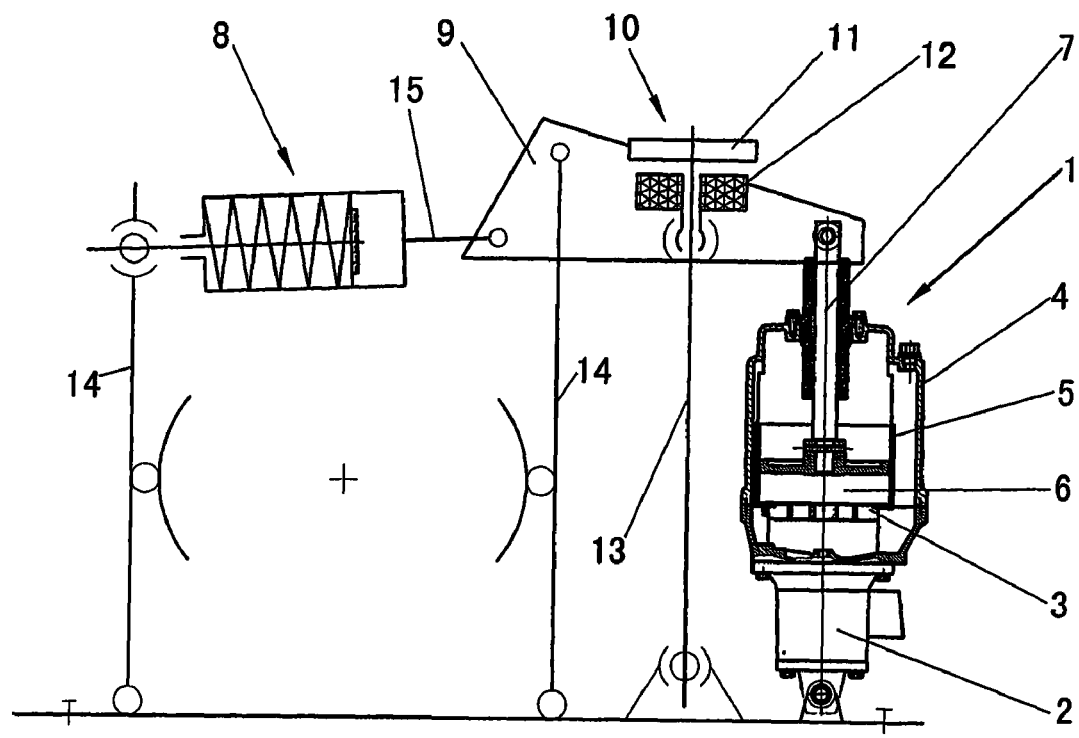
FIG. 5 is a structural view of the driving unit in a fourth embodiment according to the present invention, in which another variation of the electromagnetic device 10 is shown.
Figure 6:
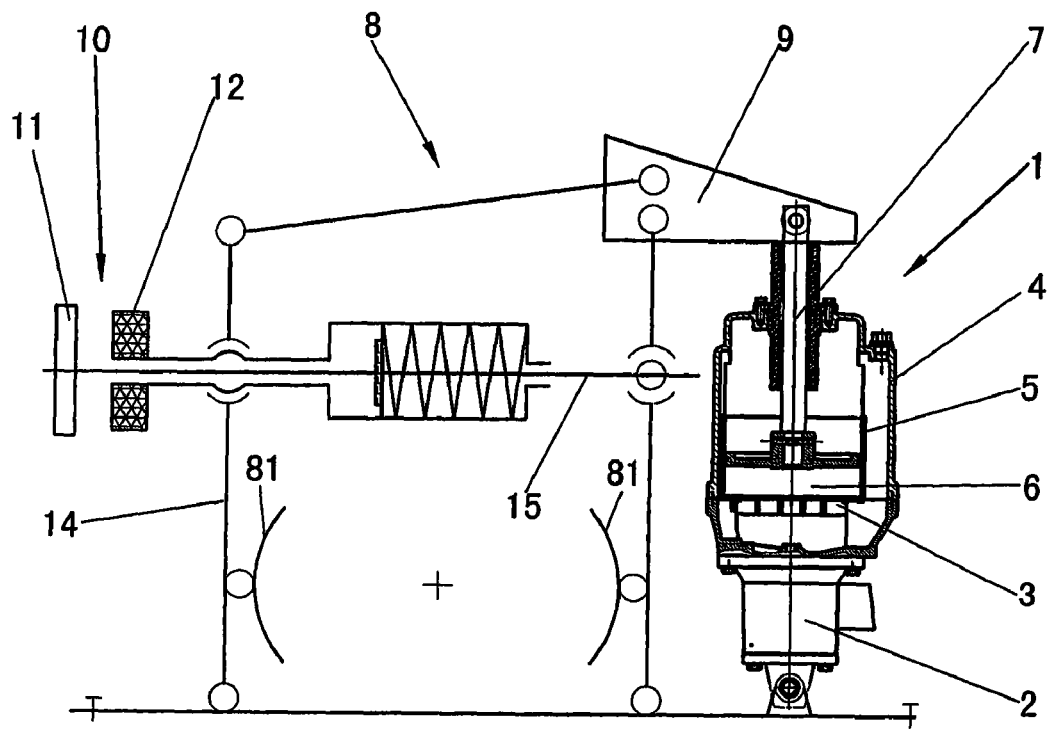
FIG. 6 is a structural schematic view of the driving unit in a fifth embodiment according to the present invention, in which the third variation of the electromagnetic device 10 is shown.

FIG. 5 is a structural view of the driving unit in a fourth embodiment according to the present invention, in which another variation of the electromagnetic device 10 is shown; and FIG. 6 is a structural schematic view of the driving unit in a fifth embodiment according to the present invention, in which the third variation of the electromagnetic device 10 is shown. Configuration of the electromagnetic device 10 shown in above FIGS. 2-4 is to be integrated with the driving unit body 20. The electromagnetic device 10 shown in FIG. 5, 6 has a detachable structure from the driving unit body 20.

In another detail embodiment, the holding device 10 is provided onto the driving mechanism 9 of the braking portion 8, wherein the holding device 10 comprises a dynamic iron core 12 connected with the driving mechanism 9 and a static iron core 11 fixedly connected to a holding rod 13, wherein the holding rod 13 is penetrated through the dynamic iron core 12 of the holding device 10. As shown in FIG. 5, the electromagnetic device 10 is provided on the driving mechanism 9 of the braking portion and is a form of a structure separate and independent from the driving unit 1. The dynamic iron core 12 of the electromagnetic device 10 is fixed onto the driving mechanism 9, the static iron core 11 of the electromagnetic device 10 is connected to the upper end of the holding rod 13 which penetrates through the dynamic iron core 12 of the electromagnetic device 10. It shall be explained that the braking portion shown in Figs. is in a normally open type structure. When the braking portion has the normally open type structure, the driving device 2 drives the hydraulic pump 3, the pressured liquid is entered into the driving liquid cavity 6 of the hydraulic cylinder 5, the pressured liquid drives the piston rod (i.e. the push rod) 7 moved upwardly to the predetermined position, then the driving mechanism 9 of the braking portion is swung upwardly so that the braking portion 8 is implemented into a the braking mode; the dynamic iron core 12 of the electromagnetic device 10 is moved upwardly with the upward swinging of the driving mechanism 9 to attract and engage with the static iron core 11, so that the holding rod 13 is kept under the fixed position state, thereby, the braking portion 8 is kept under the braking state, and afterward, the driving device 2 is powered off, and then, the driving device 2 is stopped so that the energy consumption is reduced.

In another detailed embodiment, a holding device 10 is provided on a braking arm 14 of a braking portion 8, the holding device 10 comprises a dynamic iron core 12 connected with the braking arm 14 and a static iron core 11 fixedly connected with the outer end of a braking spring push rod 15. The braking spring push rod 15 is penetrated through the dynamic iron core 12 of the holding device 10. As shown in FIG. 6, the braking portion 8 is in a normally close type structure. The electromagnetic device 10 is provided on the braking arm 14 in the braking portion 8, which is in another structure separate and independent from the driving unit 1. The dynamic iron core 12 of the electromagnetic device 10 is mounted on the braking arm 14, the static iron core 11 of the electromagnetic device 10 is connected with the outer end of the braking spring push rod 15 in the braking portion 8, the braking spring push rod 15 is penetrated through the dynamic iron core 12 of the electromagnetic device 10. The operation process thereof is as follows: the driving device 2 drives the hydraulic pump 3, then, the pressured liquid is entered into the driving liquid cavity 6 of the hydraulic cylinder 5 to drive the piston rod (i.e. the push rod) 7 to move upwardly to the predetermined position. Then, the driving mechanism 9 of the braking portion 8 is swung in upward so that the braking of the braking portion 8 is released; at the same time, the dynamic iron core 12 of the electromagnetic device 10 is moved outwardly (as shown in FIG. 6) along with the braking arm 14 in accompany with the upward swinging of the driving mechanism 9, the static iron core 11 is attracted to and engaged with the dynamic iron core 12, so that the braking spring push rod 15 is retained in a fixed position state, thereby, the braking portion 8 is kept under the braking release state, and then, the driving device is powered off and then, the driving device is stopped and the energy consumption is reduced.

Except above four forms of configurations of the electromagnetic device 10, there are a lot of variations on the basis of the technical solutions of the present invention, and all of them are supposed to fall into the protection scope of the present invention. Although in above different variations, which are explained with reference to the driving unit, the present invention is not limited thereto, as long as the electromagnet device 10 is provided onto the brake to achieve the holding device 10 to keep the braking portion 8 under the operation state, there is no limitation for the position settings of the electromagnetic device 10 served as the holding device.

According to another aspect of the present invention, referring to FIGS. 1-6, the present invention provides a brake 100, which comprises a braking portion 8, and a driving unit 1 that includes a driving device 2, a hydraulic pump 3 driven by the driving device 2, a hydraulic cylinder 5 in fluid communicating with the hydraulic pump 3 and driven by the hydraulic pump 3, wherein the hydraulic cylinder 5 is operably connected with one piston rod 7 to drive the piston rod 7 to reciprocate, the piston rod 7 is drivingly connected with the braking portion 8 of the brake 100, wherein the brake 100 is further provided with a holding device 10 keeping the braking portion 8 in an operation state.

In above embodiment, the holding device 10 for keeping the braking portion 8 under the operation state uses a form of electromagnetic device; however the present invention is not limited thereto, any proper replacement and variation can be applied.

In the process of implementing the driving unit, the hydraulic cylinder 5 can be provided inside the liquid storage tank 4; both of them can be integrated, as shown in FIGS. 1-6, such configuration has advantages such as compact structure and less space occupying. Furthermore, the hydraulic cylinder 5 can be provided outside the liquid storage tank 4 to have a separate and independent form, which is communicated with the liquid storage tank 4 through a pipe.

It would be appreciated by those skilled in the art that many modifications, alterations and substitutions may be made in these embodiments without departing from the principles and spirit of the invention, the scope of which is defined in the claims and their equivalents.

I claim:

1. A driving unit for a brake, comprising:
    a driving device;
    a hydraulic pump driven by said driving device;

a hydraulic cylinder in fluid communication with the hydraulic pump and driven by said hydraulic pump, wherein the hydraulic pump is operably connected with a piston rod to drive the piston rod to reciprocate, said piston rod being drivingly connected with a braking portion of the brake, wherein said driving unit is further provided with a holding device for keeping the braking portion under an operation state, and wherein said hydraulic cylinder includes a piston that is releasably engagable with the piston rod, wherein:

the piston of the hydraulic cylinder is moved forwardly to contact the piston rod, with the piston and the piston rod engaged with each other under the action of the driving device; and upon releasing the driving device, the piston of the hydraulic cylinder is moved backwardly to detach from the engagement with the piston rod under the action of a biasing device.

2. The driving unit for the brake as claimed in claim 1, wherein the biasing device comprises a spring positioned to bias the piston.

3. A driving unit for a brake, comprising:
a driving device;
a hydraulic pump driven by said driving device;
a hydraulic cylinder in fluid communication with the hydraulic pump and driven by said hydraulic pump, wherein the hydraulic pump is operably connected with a piston rod to drive the piston rod to reciprocate, said piston rod being drivingly connected with a braking portion of the brake, wherein said driving unit is further provided with a holding device for keeping the braking portion under an operation state, and wherein said holding device is configured to surround the piston rod, said holding device includes: a static iron core fixedly connected with a driving unit body, and a dynamic iron core connected with the piston rod to move together with the piston rod, said static iron core and said dynamic iron core being positioned to engage with each other under an electromagnetic force.

4. The driving unit for the brake as claimed in claim 3, wherein:
said hydraulic cylinder comprises a piston fixedly connected with the piston rod.

5. The driving unit for the brake as claimed in claim 3, wherein:
the holding device is provided in a cavity at one end of the driving unit body, said cavity is opened at one end, a cover plate is removably connected onto the opening of the cavity to facilitate assembling and disassembling the holding device.

6. The driving unit for the brake as claimed in claim 3, further comprising:
a liquid storage tank, wherein the hydraulic cylinder and the hydraulic pump are accommodated in the liquid storage tank.

7. The driving unit for the brake as claimed in claim 6, wherein:
an inlet of said hydraulic pump is in communication with the liquid storage tank; and
an outlet of said hydraulic pump is in communication with a driving liquid cavity of the hydraulic cylinder.

8. The driving unit for the brake as claimed in claim 6 or 7, wherein:

the hydraulic pump is an impeller type centrifugal pump or a plunger pump.

9. The driving unit for the brake as claimed in claim 3, wherein:
said hydraulic cylinder comprises a piston engaged with the piston rod in a contact engagement structure, wherein:
the piston of said hydraulic cylinder is moved forwardly to contact with the piston rod and engaged with each other under the action of the driving device; and
under the action of releasing the driving device, the piston of the hydraulic cylinder is moved backwardly to detach from the engagement with the piston rod under the action of a biasing device.

10. The driving unit for the brake as claimed in claim 9, wherein the biasing device comprises: a spring configured to bias the piston.

11. A driving unit for a brake, comprising:
a driving device;
a hydraulic pump driven by said driving device;
a hydraulic cylinder in fluid communication with the hydraulic pump and driven by said hydraulic pump, wherein the hydraulic pump is operably connected with a piston rod to drive the piston rod to reciprocate, said piston rod being drivingly connected with a braking portion of the brake, wherein said driving unit is further provided with a holding device for keeping the braking portion under an operation state, and wherein:
the holding device is coupled to a driving mechanism of the braking portion,
the holding device comprises: a dynamic iron core connected with the driving mechanism and a static iron core fixedly connected with a holding rod, wherein the holding rod penetrates through the dynamic iron core of the holding device.

12. A driving unit for a brake, comprising:
a driving device;
a hydraulic pump driven by said driving device;
a hydraulic cylinder in fluid communication with the hydraulic pump and driven by said hydraulic pump, wherein the hydraulic pump is operably connected with a piston rod to drive the piston rod to reciprocate, said piston rod being drivingly connected with a braking portion of the brake, wherein said driving unit is further provided with a holding device for keeping the braking portion under an operation state, and wherein:
the holding device is coupled to a braking arm of the braking portion,
the holding device includes: a dynamic iron core connected with the braking arm and a static iron core fixedly connected with an outer end of a braking spring push rod, wherein the braking spring push rod penetrates through the dynamic iron core of the holding device.

13. A brake comprising:
a braking portion; and
a driving unit, which comprises:
a driving device;
a hydraulic pump driven by said driving device;
a hydraulic cylinder in fluid communication with the hydraulic pump and driven by said hydraulic pump, wherein the hydraulic pump is operably connected with a piston rod to drive the piston rod to reciprocate, said piston rod being drivingly connected with the braking portion of the brake, wherein said brake is further provided with a holding device for keeping the braking portion under an operation state, and wherein said holding device is configured to surround the piston rod, said holding device includes: a static iron core fixedly connected with a driving unit body, and a dynamic iron core connected with the piston rod to move together with the piston rod, said static iron core and said dynamic iron core being positioned to engage with each other under an electromagnetic force.

14. The brake as claimed in claim 13, wherein:

the braking portion comprises a driving mechanism, said piston rod is drivingly connected with the driving mechanism of the braking portion in a hinge arrangement.

15. The brake as claimed in claim 13, wherein the braking portion includes: two opposing braking arms; corresponding braking scotches respectively provided on said two braking arms; and a braking wheel sandwiched between said two braking scotches.

16. The brake as claimed in claim 13, wherein:

a spring push rod is further provided between said two braking arms.

17. The brake as claimed in claim 13, wherein:

the holding device is provided in a cavity at one end of the driving unit body, said cavity is opened at one end, a cover plate is removably connected onto the opening of the cavity to easily assemble and disassemble the holding device.

18. A brake, comprising:

a braking portion; and a driving unit, which comprises:

a driving device;

a hydraulic pump driven by said driving device;

a hydraulic cylinder in fluid communication with the hydraulic pump and driven by said hydraulic pump, wherein the hydraulic pump is operably connected with a piston rod to drive the piston rod to reciprocate, said piston rod being drivingly connected with the braking portion of the brake, wherein said brake is further provided with a holding device for keeping the braking portion under an operation state, and wherein:

the holding device is coupled to the driving mechanism of the braking portion, the holding device comprises: a dynamic iron core connected with the driving mechanism and a static iron core fixedly connected with a holding rod, wherein the holding rod penetrates through the dynamic iron core of the holding device.

19. A brake, comprising:

a braking portion; and a driving unit, which comprises:

a driving device;

a hydraulic pump driven by said driving device;

a hydraulic cylinder in fluid communication with the hydraulic pump and driven by said hydraulic pump, wherein the hydraulic pump is operably connected with a piston rod to drive the piston rod to reciprocate, said piston rod being drivingly connected with the braking portion of the brake, wherein said brake is further provided with a holding device for keeping the braking portion under an operation state, and wherein:

the holding device is coupled to the braking arm of the braking portion, the holding device includes: a dynamic iron core connected with the braking arm and a static iron core fixedly connected with an outer end of a braking spring push rod, wherein the braking spring push rod penetrates through the dynamic iron core of the holding device.

* * * * *

UNITED STATES PATENT AND TRADEMARK OFFICE
CERTIFICATE OF CORRECTION

| | |
|---|---|
| PATENT NO. | : 8,205,446 B2 |
| APPLICATION NO. | : 12/267004 |
| DATED | : June 26, 2012 |
| INVENTOR(S) | : Xingyun Xie |

It is certified that error appears in the above-identified patent and that said Letters Patent is hereby corrected as shown below:

In the Specifications

In column 9, line 47, delete "a the" and insert -- a --, therefor.

Signed and Sealed this
Seventh Day of May, 2013

Teresa Stanek Rea
*Acting Director of the United States Patent and Trademark Office*